(12) United States Patent
Yoshimi et al.

(10) Patent No.: US 7,830,480 B2
(45) Date of Patent: *Nov. 9, 2010

(54) LIQUID CRYSTAL PANEL, AND LIQUID CRYSTAL DISPLAY

(75) Inventors: Hiroyuki Yoshimi, Ibaraki (JP); Kentarou Takeda, Ibaraki (JP); Takashi Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 53 days.

This patent is subject to a terminal disclaimer.

(21) Appl. No.: 12/269,521

(22) Filed: Nov. 12, 2008

(65) Prior Publication Data

US 2009/0128759 A1      May 21, 2009

(30) Foreign Application Priority Data

Nov. 20, 2007   (JP)   ............................. 2007-300399

(51) Int. Cl.
    *G02F 1/1335*   (2006.01)
(52) U.S. Cl. ........................... 349/118; 349/56; 349/84; 349/117
(58) Field of Classification Search ................ 349/56, 349/84, 117, 118
    See application file for complete search history.

(56) References Cited

U.S. PATENT DOCUMENTS

| 7,557,883 | B2 | 7/2009 | Kawamoto et al. |
| 7,561,233 | B2 | 7/2009 | Hisatake |
| 2005/0057714 | A1 | 3/2005 | Jeon et al. |
| 2007/0172606 | A1 | 7/2007 | Shunsuke et al. |
| 2007/0285602 | A1 | 12/2007 | Takeda et al. |
| 2008/0008476 | A1 | 1/2008 | Yamamoto |
| 2008/0165312 | A1 | 7/2008 | Sakurazawa et al. |
| 2009/0066886 | A1* | 3/2009 | Shimizu et al. ............... 349/96 |
| 2009/0231528 | A1 | 9/2009 | Nakano et al. |

FOREIGN PATENT DOCUMENTS

| JP | 2006-184835 A | 7/2006 |
| JP | 2006-268016 A | 10/2006 |
| JP | 2006-527394 A | 11/2006 |
| JP | 2007-148016 A | 6/2007 |
| KR | 10-2006-0117995 A | 11/2006 |
| KR | 10-2007-0004047 A | 1/2007 |
| WO | 2005/078516 A1 | 8/2005 |
| WO | 2005/091024 A1 | 9/2005 |
| WO | 2006/090887 A1 | 8/2006 |

OTHER PUBLICATIONS

Korean Office Action dated Feb. 25, 2010, issued in corresponding Korean Patent Application No. 10-2008-0066770.
Japanese Office Action, issued Apr. 23, 2010 for corresponding Japanese Patent Application No. 2007-300399.

* cited by examiner

*Primary Examiner*—Jennifer Doan
(74) *Attorney, Agent, or Firm*—Westerman, Hattori, Daniels & Adrian, LLP (57) ABSTRACT

A liquid crystal panel or the present invention comprising a liquid crystal cell, a first polarizer and a second polarizer provided on both sides of the liquid crystal cell, a first optical compensation layer provided between the liquid crystal cell and the first polarizer, and a second optical compensation layer provided between the liquid crystal cell and the second polarizer, wherein a wavelength dispersion of the liquid crystal cell satisfies $Re_{40}(450)>Re_{40}(550)>Re_{40}(650)$, an index ellipsoid of the first optical compensation layer satisfies a relationship of $nx>nz>ny$, and a wavelength dispersion of the second optical compensation layer satisfies $Re_{40}(450) \geqq Re_{40}(550) \geqq Re_{40}(650)$.

9 Claims, 7 Drawing Sheets

LIQUID CRYSTAL PANEL, AND LIQUID CRYSTAL DISPLAY

FIELD OF THE INVENTION

The present invention relates to a liquid crystal panel, and a liquid crystal display.

A liquid crystal display (hereinafter, also referred to as "LCD") is a device that displays characters and images using electro-optical characteristics of liquid crystal molecules. LCDs are widely used in portable phones, notebook computers, liquid crystal televisions, and the like. In the LCDs, generally used is a liquid crystal panel in which polarizing plates are arranged on both sides of a liquid crystal cell. For example, in a case of the liquid crystal panel employing a normally black system, display is black when no voltage is applied (see, Japanese Patent Publication No. 3648240, for example).

In a conventional liquid crystal panel, an optical compensation layer and a polarizer are arranged in this order on either side of the liquid crystal cell (for example, viewing side of the liquid crystal cell). Further, on the other side of the liquid crystal cell (for example, opposite side of the viewing side of the liquid crystal cell), an optical compensation layer and a polarizer are arranged in this order. The aforementioned optical compensation layer is generally called "retardation film" or "birefringence layer". The optical compensation layer is used for the purpose of an optical compensation of a liquid crystal panel such as improvement in viewing angle characteristics, improvement in color shift, improvement in contrast, and the like.

In recent years, LCDs have been made highly precious, and has had a variety of applications. Therefore, it is desired to provide LCDs realizing excellent displaying quality.

However, in conventional LCDs, there is a difficulty in providing neutral display with no coloring in all directions, and an improvement in this point is demanded.

SUMMARY OF THE INVENTION

It is an object of the present invention to provide a liquid crystal panel and a liquid crystal display capable of achieving neutral display with substantially no coloring in all directions.

The present invention provides a liquid crystal panel comprising a liquid crystal cell, a first polarizer and a second polarizer provided on both sides of the liquid crystal cell, a first optical compensation layer provided between the liquid crystal cell and the first polarizer, and a second optical compensation layer provided between the liquid crystal cell and the second polarizer, wherein a wavelength dispersion of the liquid crystal cell satisfies $Re_{40}(450) > Re_{40}(550) > Re_{40}(650)$, an index ellipsoid of the first optical compensation layer satisfies a relationship of $nx > nz > ny$, and a wavelength dispersion of the second optical compensation layer satisfies $Re_{40}(450) \geq Re_{40}(550) \geq Re_{40}(650)$. The $Re_{40}(\lambda)$ represents a retardation value measured from the direction of a polar angle of 40° at 23° C. with light of a wavelength λ nm, the nx represents a refractive index in the direction in which the refractive index is maximum in a plane of the optical compensation layers or the liquid crystal cell (X axis direction), the ny represents a refractive index in the direction orthogonal to the X axis direction in the plane (Y axis direction), and the nz represents a refractive index in the direction orthogonal to the X axis direction and the Y axis direction.

Here, a retardation of a substance depends on wavelength, and a wavelength dispersion of a retardation value can be generally classified into following three kinds. The first wavelength dispersion is a case where the retardation value becomes larger as the wavelength becomes shorter in a visible light region. The second wavelength dispersion is a case where the retardation value little changes over the range of the wavelength from shorter side to longer side in the visible light region. The third wavelength dispersion is a case where the retardation value becomes smaller as the wavelength becomes shorter in the visible light region.

In the liquid crystal cell of the liquid crystal panel, the wavelength dispersion satisfies $Re_{40}(450) > Re_{40}(550) > Re_{40}(650)$. Therefore the liquid crystal cell has such a wavelength dispersion that the retardation value based on $Re_{40}$ becomes larger as the wavelength becomes shorter in the visible light region (hereinafter, referred to as "positive dispersion").

A wavelength dispersion of the second optical compensation layer of the liquid crystal panel satisfies $Re_{40}(450) \geq Re_{40}(550) \geq Re_{40}(650)$. Therefore the second optical compensation layer has such a wavelength dispersion that the retardation value based on $Re_{40}$ little changes over the range from shorter wavelength side to the longer wavelength side (hereinafter, referred to as "flat dispersion").

In the present invention, the wavelength dispersion is based on $Re_{40}$.

In the liquid crystal panel of the present invention, on one side of the liquid crystal cell having positive dispersion, the first optical compensation layer whose index ellipsoid satisfies the relationship of $nx > nz > ny$ is arranged, and on the other side of the liquid crystal cell, the second optical compensation layer having positive dispersion or flat dispersion is arranged.

Such a liquid crystal panel is able to realize neutral display with substantially no coloring in all directions.

In a preferable liquid crystal panel of the present invention, a wavelength dispersion of the first optical compensation layer satisfies $0.7 < Re_{40}(450)/Re_{40}(550) < 1.2$.

In a preferable liquid crystal panel of the present invention, an index ellipsoid of the second optical compensation layer satisfies a relationship of $nx \geq ny > nz$.

In a preferable liquid crystal panel of the present invention, an Nz coefficient of the second optical compensation layer is larger than an Nz coefficient of the first optical compensation layer.

In a preferable liquid crystal panel of the present invention, a ratio of retardation values ($Re_{40}(450)/Re_{40}(550)$) of the first optical compensation layer is smaller than a ratio of retardation values ($Re_{40}(450)/Re_{40}(550)$) of the liquid crystal cell.

In a preferable liquid crystal panel of the present invention, the first optical compensation layer contains at least one kind of polymer selected from norbornene-based polymers, mixed polymers of a polycarbonate-based polymer and a styrene-based polymer, cellulose-based polymers, polyvinyl alcohol-based polymers, and polyester-based polymers as a main component.

In a preferable liquid crystal panel of the present invention, the second optical compensation layer contains at least one kind of polymer selected from norbornene-based polymers, polyimide-based polymers, and polyester-based polymers as a main component.

In a preferable liquid crystal panel of the present invention, the liquid crystal cell is in a vertically aligned (VA) mode.

Also, according to another aspect, the present invention provides a liquid crystal display.

The liquid crystal display of the present invention has any one of the aforementioned liquid crystal panel.

The liquid crystal panel of the present invention can achieve neutral display with substantially no coloring in all directions as described above. Therefore, the liquid crystal display of the present invention having the liquid crystal panel is excellent in uniformity of the display and high in displaying quality.

DETAILED DESCRIPTION OF THE PREFERRED EMBODIMENTS

The terms used hereinafter have the following means.

(1) Optical Compensation Layer:

"Optical compensation layer" is a film exhibiting birefringence (anisotropy in refractive index) in the plane and/or in the thickness direction. The optical compensation layer includes, for example, those having in-plane birefringence index and/or birefringence index in the thickness direction at wavelength of 590 nm at 23° C. of $1 \times 10^{-4}$ or more.

(2) nx, ny, nz:

"nx", "ny" and "nz" represent refractive indexes of different directions one another. The nx represents a refractive index in the direction in which in-plane refractive index is maximum (X axis direction). The ny represents a refractive index in the direction orthogonal to the X axis direction in the plane (Y axis direction). The nz represents a refractive index in the direction orthogonal to the X axis direction and Y axis direction (Z axis direction).

Here, "nx=ny" includes not only a case where nx and ny are completely identical, but also a case where they are substantially identical. The case where nx and ny are substantially identical is, for example, a case that Re (590) is from 0 nm to 10 nm, preferably from 0 nm to 5 nm, and more preferably from 0 nm to 3 nm.

"ny=nz" includes not only a case where ny and nz are completely identical, but also a case where they are substantially identical. The case where ny and nz are substantially identical is, for example, a case that Re (590)-Rth(590) is from −10 nm to 10 nm, preferably from −5 nm to 5 nm, and more preferably from −3 nm to 3 nm.

(3) $Re(\lambda)$:

"In-plane retardation value ($Re(\lambda)$)" is a retardation value in the plane measured at 23° C., with light of wavelength λ (nm). Concretely, "in-plane retardation value ($Re(\lambda)$)" is a retardation value in the plane measured at 23° C., with light of wavelength λ (nm), at polar angle of 0° (normal direction of plane of object to be measured).

When taking a thickness of object to be measured as d(nm), $Re(\lambda)$ may be determined by an expression of $Re(\lambda)=(nx-ny) \times d$.

For example, Re(590) is in-plane retardation value measured at 23° C., with light of wavelength 590 nm.

(4) $Rth(\lambda)$:

"Retardation value in the thickness direction ($Rth(\lambda)$)" is a retardation value in the thickness direction measured at 23° C., with light of wavelength λ (nm). When taking a thickness of object to be measured as d(nm), $Rth(\lambda)$ may be determined by an expression of $Rth(\lambda)=(nx-nz) \times d$.

For example, Rth(590) is a retardation value in the thickness direction measured at 23° C., with light of wavelength 590 nm.

(5) $Re_{40}(\lambda)$:

"Retardation value at polar angle of 40° ($Re_{40}(\lambda)$)" represents a retardation value measured at 23° C., with light of wavelength λ (nm) from the direction of polar angle of 40° (direction inclined by 40° from normal direction of a plane of object to be measured).

For example, $Re_{40}(450)$ is a retardation value measured at 23° C., with light of wavelength 450 nm from the direction of polar angle of 40°.

(6) Nz Coefficient:

"Nz coefficient" is a value calculated by an expression of $Rth(\lambda)/Re(\lambda)$. In the present invention, an Nz coefficient is calculated by an expression of $Rth(590)/Re(590)$ based on 590 nm. The meanings of Rth(590) and Re(590) are as described above.

(7) Orthogonal and Parallel:

"Orthogonal" includes a case where the angle made by two optical axes is 90°±2° and preferably 90°±1°. "Parallel" includes a case where the angle made by two optical axes is 0°±2° and preferably 0°±1°.

(8) Polymer:

"Polymer" includes a high polymer having degree of polymerization (total degree of polymerization of each constituent unit when the polymer includes a plurality of constituent units) of 20 or more, and a low polymer having degree of polymerization of 2 or more and less than 20 (also referred to as oligomer).

[Outline of Liquid Crystal Panel of the Present Invention]

A liquid crystal panel of the present invention comprises a liquid crystal cell, a first polarizer and a second polarizer provided on both sides of the liquid crystal cell, a first optical compensation layer provided between the liquid crystal cell and the first polarizer, and a second optical compensation layer provided between the liquid crystal cell and the second polarizer.

A wavelength dispersion of the liquid crystal cell satisfies $Re_{40}(450)>Re_{40}(550)>Re_{40}(650)$, therefore the liquid crystal cell has positive dispersion.

An index ellipsoid of the first optical compensation layer satisfies a relationship of nx>nz>ny, Preferably, a wavelength dispersion of the first optical compensation layer satisfies $0.7<Re_{40}(450)/Re_{40}(550)<1.2$.

The second optical compensation layer satisfies $Re_{40}(450) \geq Re_{40}(550) \geq Re_{40}(650)$, therefore the second optical compensation layer has positive dispersion or flat dispersion.

Preferably, an index ellipsoid of the second optical compensation layer satisfies a relationship of $nx \geq ny > nz$.

[Constitution Example of Liquid Crystal Panel]

Figure 1:
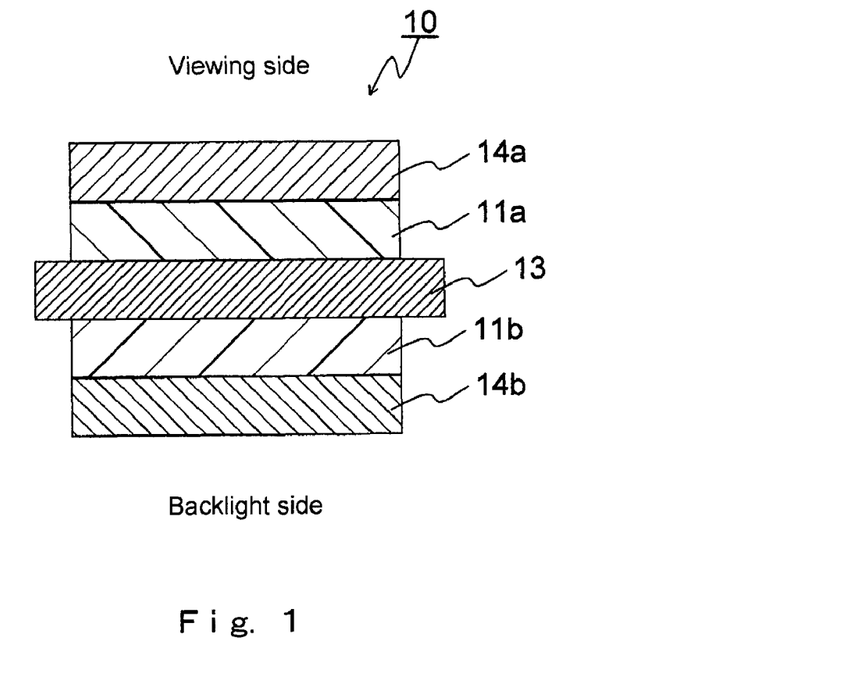
FIG. 1 is a schematic section view showing one example of constitution of a liquid crystal panel of the present invention.

FIG. 1 shows one example of a constitution of a liquid crystal panel of the present invention. For facilitation of understanding, size, proportion, and the like of each constituent member is different from the actual size (ditto with other drawings).

As shown in FIG. 1, a liquid crystal panel 10 has a liquid crystal cell 13, a first polarizing plate 14a, a second polarizing plate 14b, a first optical compensation layer 11a, and a second optical compensation layer 11b. The first polarizing plate 14a is arranged, for example, on the viewing side of the liquid crystal cell 13. The second polarizing plate 14b is arranged, for example, on the opposite viewing side of the liquid crystal cell 13. The first optical compensation layer 11a is arranged between the liquid crystal cell 13 and the first polarizing plate 14a. The second optical compensation layer 11b is arranged between the liquid crystal cell 13 and the second polarizing plate 14b.

The first polarizing plate 14a and the second polarizing plate 14b include a polarizer, and a protective layer as necessary. As the protective layer, isotropic film having excellent transparency is generally used. The first optical compensation layer 11a or the second optical compensation layer 11b may be directly adhered to the polarizer. In this case, the first and the second optical compensation layers 11a, 11b also function as protective layers of the polarizer.

The first polarizing plate 14a and the second polarizing plate 14b are generally arranged so that the direction of absorption axis of the first polarizing plate (first polarizer) 14a and the direction of absorption axis of the second polarizing plate (second polarizer) 14b are orthogonal to each other.

Preferably, the first optical compensation layer 11a is arranged so that the direction of absorption axis of the first polarizing plate (first polarizer) 14a and the direction of slow axis of the first optical compensation layer 11a are orthogonal to each other.

Preferably, the second optical compensation layer 11b is arranged so that the direction of absorption axis of the second polarizing plate (second polarizer) 14b and the direction of slow axis of the second optical compensation layer 11b are orthogonal to each other.

Figure 2:
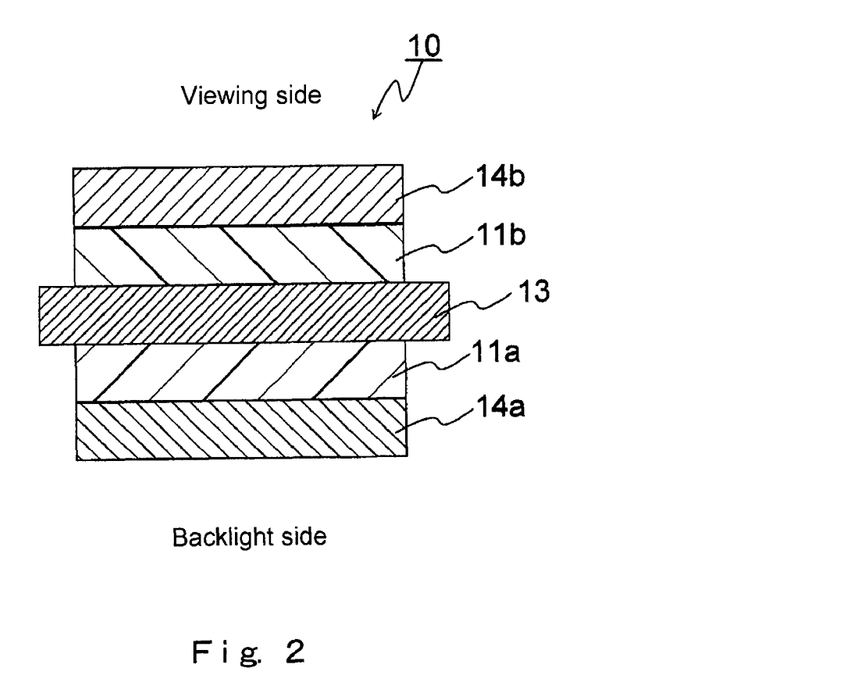
FIG. 2 is a schematic section view showing another example of constitution of a liquid crystal panel of the present invention.

FIG. 2 shows another example of a constitution of a liquid crystal panel of the present invention.

As a liquid crystal panel 10 shown in FIG. 2, a first polarizing plate 14a is arranged on the opposite viewing side of a liquid crystal cell 13 and a second polarizing plate 14b is arranged on the viewing side of the liquid crystal cell 13. A first optical compensation layer 11a is arranged between the liquid crystal cell 13 and the first polarizing plate 14a. A second optical compensation layer 11b is arranged between the liquid crystal cell 13 and the second polarizing plate 14b.

The liquid crystal panel 10 of the present invention may be provided with an optical compensation layer (not illustrated) other than the first optical compensation layer 11a between the liquid crystal cell 13 and the first polarizing plate 14a. This another optical compensation layer may be arranged between the first optical compensation layer 11a and the liquid crystal cell 13, or may be arranged between the first optical compensation layer 11a and the first polarizing plate 14a.

The liquid crystal panel of the present invention may be provided with an optical compensation layer (not illustrated) other than the second optical compensation layer 11b between the liquid crystal cell 13 and the second polarizing plate 14b. This another optical compensation layer may be arranged between the second optical compensation layer 11b and the liquid crystal cell 13, or may be arranged between the second optical compensation layer 11b and the second polarizing plate 14b.

Each of the optical compensation layers may be formed of a single layer, or a film having a multilayer structure of two or more layers.

Between these constituent members (optical members) of the liquid crystal panel, an arbitrary adhesive layer or an arbitrary optical member (preferably, a film exhibiting isotropy (an index ellipsoid of the film satisfies a relationship of $nx=ny=nz$), or the like) may be arranged.

[Liquid Crystal Cell]

As the liquid crystal cell of the present invention, for example, an active matrix type using a thin film transistor and the like may be exemplified. In addition, as the liquid crystal cell, a simple matrix type as is employed in a super-twisted nematic liquid crystal display may be used.

In the liquid crystal cell, a liquid crystal layer is generally formed by a pair of substrates.

Figure 3:
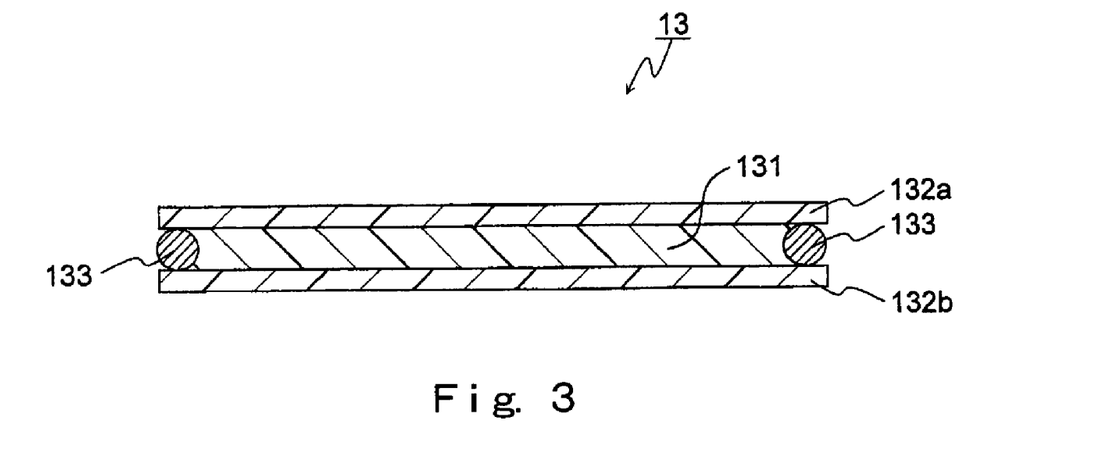
FIG. 3 is a schematic section view showing one example of constitution of a liquid crystal cell.

FIG. 3 shows one example of a constitution of the liquid crystal cell.

As shown in FIG. 3, a liquid crystal cell 13 is formed with a space by a spacer 133 being interposed between a pair of substrates 132a and 132b. In this space, a liquid crystal layer 131 enclosing liquid crystal molecules is provided. Although not particularly illustrated, one of the pair of substrates (active matrix substrate) is provided with, for example, a switching element (for example, TFT) that controls electro-optical characteristics of the liquid crystal, and a scanning line for supplying the switching element with a gate signal. The other of the pair of substrates is provided with, for example, a color filter.

The color filter may be provided to the active matrix substrate. Alternatively, when a tricolor light source of RGB is used as an illuminating means for a liquid crystal display (field sequential system), for example, the color filter may be omitted. An interval between the pair of substrates (cell gap) is controlled, for example, by a spacer. The cell gap ranges, for example, from 1.0 μm to 7.0 μm. An orientation film made, for example, of polyimide, is provided to the side where each substrate contacts with the liquid crystal layer. Further, the orientation film may be omitted, for example, in a case where initial orientation of liquid crystal molecules is controlled by utilizing fringe field formed by a patterned transparent substrate.

A wavelength dispersion of the liquid crystal cell satisfies $Re_{40}(450) > Re_{40}(550) > Re_{40}(650)$. This is a liquid crystal cell having positive dispersion.

A ratio of retardation values ($Re_{40}(\lambda)$) of the liquid crystal cell (ratio of $Re_{40}$ between a wavelength of 450 nm and a wavelength of 550 nm) is preferably $1.0 < Re_{40}(450)/Re_{40}(550) < 1.1$, and more preferably $1.02 < Re_{40}(450)/Re_{40}(550) < 1.08$. Further, a ratio of retardation values ($Re_{40}(\lambda)$) of the liquid crystal cell (ratio of $Re_{40}$ between a wavelength of 550 nm and a wavelength of 650 nm) is preferably $0.9 < Re_{40}(650)/Re_{40}(550) < 1.0$, and more preferably $0.92 < Re_{40}(650)/Re_{40}(550) < 0.98$. By providing such a liquid crystal cell in which wavelength dispersion is not relatively acute, with the first and the second optical compensation layers, it is possible to greatly suppress light leakage in all directions.

In the liquid crystal cell, an index ellipsoid thereof preferably satisfies a relationship of nx=ny<nz. As the liquid crystal cell having an index ellipsoid satisfying a relationship of nx=ny<nz, a vertically aligned (VA) mode, a twisted-nematic (TN) mode, a vertically-aligned electric field control birefringence (ECB) mode, an optical compensation birefringence (OCB) mode, and the like can be exemplified according to a classification of a liquid crystalline orientation mode. In the present invention, the liquid crystalline orientation mode of the liquid crystal cell is preferably the vertically aligned (VA) mode.

In a condition where electric field is absent, Rth(590) of the liquid crystal cell is preferably from −500 nm to −200 nm, and more preferably from −400 nm to −200 nm. The Rth(590) may be appropriately set by adjusting kinds of liquid crystal molecules and/or cell gap of the liquid crystal cell.

The liquid crystal cell of the VA mode utilizes a voltage control birefringence effect. Such the liquid crystal cell of the VA mode makes liquid crystal molecules oriented in homeotropic alignment in the absence of electric field, respond to electric field in the normal direction to the substrates. Concretely, when the liquid crystal cell operates according to a normally black system, liquid crystal molecules are oriented in the normal direction to the substrates in the absence of electric field. Since polarizing plates are arranged on both sides of the liquid crystal cell in the form of crossed nicols, straight polarized light fails to transmit a polarizer of the viewing side, so that a screen displays in black. On the other hand, in the presence of electric field, the liquid crystal cell operates so that the liquid crystal molecules are inclined at an azimuth of 45° with respect to the absorption axis of the polarizing plates. Therefore, the transmittance is increased, and straight polarized light transmits the polarizer on the viewing side, so that the screen displays in white. As for operation of the liquid crystal cell of VA mode, concrete disclosures are found, for example, in Japanese Patent Application Laid-Open Publication No. S62-210423, Japanese Patent Application Laid-Open Publication No. H4-153621, and the like.

The liquid crystal cells of the VA mode may be those that are multi domains as described in Japanese Patent Application Laid-Open Publication No. H11-258605. Examples of such the liquid crystal cell include "ASV (Advanced Super View) mode" (trade name) manufactured by Sharp Corporation, "CPA (Continuous Pinwheel Alignment) mode" (trade name) manufactured by Sharp Corporation, "MVA (Multi-domain Vertical Alignment) mode" (trade name) manufactured by Fujitsu Ltd., "PVA (Patterned Vertical Alignment) mode" (trade name) manufactured by Samsung Electronics Co., Ltd., "EVA (Enhanced Vertical Alignment) mode" (trade name) manufactured by Samsung Electronics Co., Ltd., "SURVIVAL (Super Ranged Viewing Vertical Alignment) mode" (trade name) manufactured by Sanyo Electric Co., Ltd., and the like.

In addition, as a liquid crystal panel of the present invention, for example, a liquid crystal cell installed in a commercially available liquid crystal display may be used as it is. Examples of commercially available liquid crystal display equipped with the liquid crystal cell of the VA mode include a liquid crystal TV manufactured by Sharp Corporation under the trade name of "AQUOS series", a liquid crystal TV manufactured by Sony Corporation under the trade name of "BRAVIA series", a 32V-inch wide model liquid crystal TV manufactured by Samsung Electronics Co., Ltd. under the trade name of "LN32R51B", a liquid crystal TV manufactured by Nanao Corporation under the trade name of "FORIS SC26XD1", a liquid crystal TV manufactured by AU Optronics Corporation under the trade name of "T460HW01", and the like.

(First Optical Compensation Layer)

The first optical compensation layer has an index ellipsoid satisfying a relationship of nx>nz>ny.

A ratio of retardation values of the first optical compensation layer (ratio of $Re_{40}$ between a wavelength of 450 nm and a wavelength of 550 nm) is preferably $0.7<Re_{40}(450)/Re_{40}(550)<1.2$.

Further, the ratio of retardation values of the firs optical compensation layer is more preferably $0.75<Re_{40}(450)/Re_{40}(550)<1.15$ and particularly preferably $0.80<Re_{40}(450)/Re_{40}(550)<1.10$.

The ratio of retardation values ($Re_{40}(450)/Re_{40}(550)$) of the first optical compensation layer is preferably smaller than a ratio of retardation values ($Re_{40}(450)/Re_{40}(550)$) of a liquid crystal cell.

Also, A ratio of retardation values of the first optical compensation layer (ratio of $Re_{40}$ between a wavelength of 650 nm and a wavelength of 550 nm) is preferably $0.8<Re_{40}(650)/Re_{40}(550)<1.3$, and more preferably $0.9<Re_{40}(650)/Re_{40}(550)<1.2$.

Here, an optical compensation layer having reverse dispersion can be defined by $Re_{40}(450)/Re_{40}(550)<0.97$. Further, an optical compensation layer having flat dispersion can be defined by $0.97 \leq Re_{40}(450)/Re_{40}(550)<1.05$. An optical compensation layer having positive dispersion can be defined by $1.05<Re_{40}(450)/Re_{40}(550)$.

As the first optical compensation layer, the optical compensation layer having positive dispersion or a optical compensation layer having flat dispersion is preferably used, and more preferably the optical compensation layer having flat dispersion is used.

An Nz coefficient of the first optical compensation layer is preferably from 0.1 to 0.9, and more preferably from 0.2 to 0.8, and particularly preferably from 0.3 to 0.7.

Further, the Nz coefficient of the first optical compensation layer is preferably smaller than an Nz coefficient of a second optical compensation layer.

Each of the first optical compensation layer may be formed of a single layer, or a laminate body having multiplayer structure of two or more layers. A thickness of the first optical compensation layer is, for example, from 0.5 μm to 200 μm. Transmittance (T(590)) of the first optical compensation layer is preferably 90% or more.

The first optical compensation layer may be formed of any arbitrary materials and by any arbitrary forming method as far as the first optical compensation layer has the wavelength dispersion and the index ellipsoid as described above.

Re(590) of the first optical compensation layer is, for example, 10 nm or more, and preferably from 10 nm to 600 nm. Further, Rth(590) of the first optical compensation layer is, for example, 10 nm or more, and preferably from 30 nm to 400 nm.

The index ellipsoid of the first optical compensation layer satisfies a relationship of nx>nz>ny, therefore Rth(590) is smaller than Re (590). In this case, difference (Re(590)-Rth (590)) between Re(590) and Rth(590) is, for example, from 10 nm to 500 nm, and preferably from 20 nm to 300 nm.

As the first optical compensation layer whose index ellipsoid satisfies a relationship of nx>nz>ny, a polymer film (retardation film) having a refractive index controlled in the thickness direction, an oriented film of a liquid crystal polymer, and the like may be used.

As for polymers that form the polymer film, for example, a polycarbonate-based; a styrene-based; a polyolefin-based such as polypropylene; a polyester-based such as polyethylene terephthalate, and polyethylene naphthalate; a norbornene-based; a polyvinyl alcohol-based; a polyvinyl butyral-based; an acrylate-based such as polyhydroxyethyl acrylate; a cellulose-based such as hydroxyethyl cellulose, methylcellulose, and triacetyl cellulose; a polyarylate-based; a polysulfone-based; a polyamide-based; a polyimide-based; a polyvinyl chloride-based; a polymer made of polymerization of these; a mixed polymer of these polymers, and the like may be used. Preferably, the polymer film contains at least one kind of polymer selected from norbornene-based polymers, mixed polymers of a polycarbonate-based polymer and a styrene-based polymer, cellulose-based polymers, polyvinyl alcohol-based polymers, and polyester-based polymers as a main component.

Here, the norbornene-based polymer is a (co)polymer obtained by using a norbornene-based monomer having a norbornene ring as a part or the whole of a starting material (monomer). The term "(co)polymer" represents homopolymer or copolymer.

As for the norbornene-based polymer, the norbornene-based monomer having a norbornene ring (having double bond in norbornane ring) is used as a starting material. The norbornene-based polymer may have the norbornane ring or may not have the norbornane ring as a constituent unit in (co)polymer state. Examples of the norbornene-based polymer having the norbornene ring as a constituent unit in (co) polymer state include tetracyclo[4.4.1$^{2,5}$.1$^{7,10}$.0]deca-3-ene, 8-methyltetracyclo[4.4.1$^{2,5}$.1$^{7,10}$.0]deca-3-ene, 8-methoxycarbonyltetracyclo[4.4.1$^{2,5}$.1$^{7,10}$.0]deca-3-ene, and the like. Examples of the norbornene-based polymer not having the norbornane ring as a constituent unit in (co)polymer state include a (co)polymer obtained by using a monomer that becomes 5-membered ring as a result of cleavage. Examples of the monomer that becomes 5-membered ring as a result of cleavage include such as norbornene, dicyclopentadiene, 5-phenylnorbornene and derivatives thereof. When the norbornene-based polymer is a copolymer, alignment state of the molecules is not particularly limited, and it may be a random copolymer, a block copolymer or a graft copolymer.

As for the retardation film containing a norbornene-based polymer, for example, a commercially available film may be used. Alternatively, the commercially available film may be used after being subjected to secondary process such as at least one of stretching process or contraction process. Examples of the commercially available film include "ARTON series (ARTON F, ARTON FX, ARTON D)" (trade name) manufactured by JSR Corporation, "ZEONOR series (ZEONOR ZF14, ZEONOR ZF15, ZEONOR ZF16)" (trade name) manufactured by Optes Inc., and the like.

The norbornene-based polymer is characterized by a small absolute value of the photoelastic coefficient (C[λ]. The λ represents a wavelength). An absolute value of the photoelastic coefficient (C[590]) of the norbornene-based polymer preferably ranges from $1\times10^{-12}$ m$^2$/N to $1\times10^{-11}$ m$^2$/N.

The term photoelastic coefficient means the likelihood of occurrence of birefringence when internal stress is generated by application of external force on a film. The photoelastic coefficient may be determined, for example, by measuring an in-plane retardation value of the film with light having a wavelength of 590 nm by using a spectroscopic ellipsometer "M-220" (product name) available from Jasco Corporation, under application of stress at 23° C. on a test piece of 2 cm×10 cm, and calculating from the inclination of a function of the retardation value and stress.

The mixed polymer of a polycarbonate-based polymer and a styrene-based polymer is a polymer obtained by mixing predetermined amounts of a polycarbonate-based polymer and a styrene-based polymer. The content of the styrene-based polymer in this mixed polymer is preferably from 10 to 40 parts by mass, more preferably from 20 to 40 parts by mass, and particularly preferably from 22 to 38 parts by mass, relative to 100 parts by mass of total solids. When the content of the styrene-based polymer is in this range, a polymer film satisfying a relationship of nx>nz>ny which hardly causes variation or unevenness in retardation values can be obtained.

The styrene-based polymer is a polymer obtained by polymerizing styrene-based monomers by an arbitrary appropriate method. Concrete examples of the styrene-based monomer include styrene, α-methylstyrene, 2,4-dimethylstyrene, and the like.

The weight-average molecular weight of the styrene-based polymer (in terms of polystyrene measured by a GPC method using tetrahydrofuran as a developing solvent) is preferably less than 20,000, more preferably from 1,000 to 10,000, particularly preferably from 1,000 to 6,000, and most preferably from 1,000 to 3,000. When the weight-average molecular weight of the styrene-based polymer is in this range, the styrene-based polymer and the polycarbonate-based polymer are uniformly mixed, and therefore a polymer film having high transparency can be obtained.

As the polycarbonate-based polymer, aromatic polycarbonate containing an aromatic bivalent phenol component and a carbonate component is preferred. Aromatic polycarbonate is generally obtained by reaction between an aromatic bivalent phenol compound and a carbonate precursor.

Concretely, the above aromatic polycarbonate may be obtained, for example, by a phosgene method in which phosgene is blown into an aromatic bivalent phenol compound in the presence of caustic alkali and a solvent, or by an ester exchange method in which ester exchange is carried out between an aromatic bivalent phenol compound and bis-aryl carbonate in the presence of a catalyst.

Concrete examples of the aromatic bivalent phenol compound include
2,2-bis(4-hydroxyphenyl)propane,
2,2-bis(4-hydroxy-3,5-dimethylphenyl)propane,
bis(4-hydroxyphenyl)methane, 1,1-bis(4-hydroxyphenyl) ethane,
2,2-bis(4-hydroxyphenyl)butane,
2,2-bis(4-hydroxy-3,5-dimethylphenyl)butane,
2,2-bis(4-hydroxy-3,5-dipropylphenyl)propane,
1,1-bis(4-hydroxyphenyl)cyclohexane,
1,1-bis(4-hydroxyphenyl)-3,3,5-trimethylcyclohexane, or the like. Concrete examples of the carbonate precursor include phosgene, diphenylcarbonate, di-p-tolylcarbonate, phenyl-p-tolylcarbonate, di-p-chlorophenyl carbonate, dinaphthylcarbonate, or the like.

The weight-average molecular weight of the polycarbonate-based polymer (in terms of polystyrene measured by a GPC method using tetrahydrofuran as a developing solvent) is preferably from 25,000 to 200,000, more preferably from 30,000 to 150,000, particularly preferably from 40,000 to 100,000, and most preferably from 50,000 to 80,000. When the weight-average molecular weight of the polycarbonate-based polymer is in this range, a polymer film having excellent mechanical strength can be obtained.

By conducting a treatment for controlling the refractive index in the thickness direction of the polymer film, namely for making the refractive index nz in the thickness direction be larger than the in-plane minimum refractive index ny, it is possible to obtain a polymer film whose index ellipsoid satisfies a relationship of nx>nz>ny.

As a method of controlling the refractive index in the thickness direction, for example, (1) a method of stretching a polymer film biaxially in the planar direction, (2) a method of stretching a polymer film uniaxially or biaxially in the planar direction, and stretching also in the thickness direction, and (3) a method of adhering a heat-shrinkable film to a polymer film, and making the heat-shrinkable film shrink, thereby stretching or/and shrinking the polymer film in the thickness direction can be recited.

Preferably, the method of controlling the refractive index in the thickness direction is the above method (3).

Concretely, in the above method (3), a heat-shrinkable film is adhered on either or both surface(s) of a polymer film, and then these are heated. The heat-shrinkable film shrinks by heating, and by the action of the shrinking force, the polymer film is stretched in the thickness direction. By stretching the polymer film in the thickness direction in the manner as described above, it is possible to obtain a polymer film whose refractive index is controlled in the thickness direction. In the case of this method, a thickness of the used polymer film is preferably about from 10 μm to 500 μm although it is appropriately selected depending on the retardation value to be designed.

As the heat-shrinkable film, for example, a biaxially stretched film, a uniaxially stretched film, and the like may be used. Examples of the material forming the heat-shrinkable film include, but are not limited to, polyester, polystyrene, polyethylene, polypropylene, polyvinyl chloride, polyvinylidene chloride, or the like. From the viewpoint of excellence in shrink uniformity and heat resistance, a biaxially stretched polypropylene film is preferably used as the heat-shrinkable film.

(Second Optical Compensation Layer)

A wavelength dispersion of the second optical compensation layer satisfies $Re_{40}(450) \geqq Re_{40}(550) \geqq Re_{40}(650)$. This is the optical compensation layer having positive dispersion or flat dispersion.

A ratio of $Re_{40}(\lambda)$ of retardation values of the second optical compensation layer (ratio of $Re_{40}$ between a wavelength of 450 nm and a wavelength of 550 nm) is preferably $1.0 \leqq Re_{40}(450)/Re_{40}(550) < 1.2$, and more preferably $1.00 < Re_{40}(450)/Re_{40}(550) < 1.15$. Further, a ratio of $Re_{40}(\lambda)$ of retardation values of the second optical compensation layer (ratio of $Re_{40}$ between a wavelength of 650 nm and a wavelength of 550 nm) is preferably $0.9 < Re_{40}(650)/Re_{40}(550) \leqq 1.0$, and more preferably $0.92 < Re_{40}(650)/Re_{40}(550) < 1.00$.

The second optical compensation layer preferably has an index ellipsoid satisfying a relationship of nx≧ny>nz. Here, the relationship of nx≧ny>nz means a relationship of nx=ny>nz or a relation ship of nx>ny>nz. Particularly, the second optical compensation layer preferably satisfies the relationship of nx=ny>nz.

In a case where the second optical compensation layer has the index ellipsoid satisfying the relationship of nx>ny>nz. An Nz coefficient of the second optical compensation layer is preferably from 1.1 to 200, and more preferably from 1.1 to 100.

The Nz coefficient of the second optical compensation layer is preferably larger than the Nz coefficient of the first optical compensation layer.

The second optical compensation layer may be formed of a single layer, or a laminate body having plural layers. A thickness of the second optical compensation layer is, for example, from 0.5 μm to 200 μm. Transmittance (T(590)) of the second optical compensation layer is preferably 90% or more.

In a case where the second optical compensation layer has the index ellipsoid satisfying the relationship of nx=ny>nz, Re(590) of the second optical compensation layer is, for example, less than 10 nm, preferably 5 nm or less, and more preferably 3 nm or less.

In a case where the second optical compensation layer has the index ellipsoid satisfying the relationship of nx>ny>nz, Re(590) of the second optical compensation layer is, for example, from 5 nm to 200 nm, and preferably from 30 nm to 130 nm.

Rth(590) of the second optical compensation layer may be appropriately set, for example, by adjusting the retardation value in the thickness direction of the liquid crystal cell and the like. Rth(590) of the second optical compensation layer is, for example, from 100 nm to 400 nm, preferably from 120 nm to 350 nm, and particularly preferably from 150 nm to 300 nm.

As the second optical compensation layer, for example, a polymer film containing a non-liquid-crystalline polymer (retardation film) is used. Such a non-liquid-crystalline polymer forms a film exhibiting optical uniaxially of nx>nz or ny>nz by its own property irrespective of orientation of a substrate.

As the non-liquid crystalline polymer, for example, a polyamide-based, a polyimide-based, a polyester-based, a polyetherketone-based, a polyamideimide-based, a cellulose-based, and a polyesteramide-based polymer is preferable. A retardation film formed from these polymers has excellent heat resistance, chemical resistance, transparency, and rich stiffness. These polymers are concretely descried, for example, in paragraphs from [0018] to [0072] of Japanese Patent Application Laid-open Publication No. 2004-46065. In a case where the polymer is formed into a film form by a solvent casting method, molecules thereof are spontaneously aligned with ease in a step in which a solvent vaporizes. Therefore, a polymer film satisfying a relationship of nx=ny>nz is easily formed by using the polymer. Further, a polymer film satisfying a relationship of nx>ny>nz is obtained by stretching the polymer film satisfying a relationship of nx=ny>nz uniaxially or biaxially.

Also, for example, a polymer film satisfying a relationship of nx≧ny>nz is obtained by stretching the norbornene-based film uniaxially or biaxially.

Preferably, the second optical compensation layer contains at least one kind of polymer selected from norbornene-based polymers, polyimide-based polymers, and polyester-based polymers as a main component.

The polymer film used as the second optical compensation layer may contain any appropriate additive. The additive includes, for example, a plasticizer, a heat stabilizer, a light stabilizer, a lubricant, an antioxidant, a UV absorber, a flame retardant, a colorant, an antistat, a compatibilizer, a crosslinker, a thickener, and the like. Content of the additive is preferably more than 0 and 10 or less parts by mass, relative to 100 parts by mass of the polymer which is a main component. Retardation films used as the first optical compensation layer may also contain any appropriate additive.

[Polarizing Plate]

In the liquid crystal panel of the present invention, it is preferable that the first polarizing plate and the second polarizing plate are arranged in such a positional relation that their absorption axes are orthogonal to each other. As described above, the first polarizing plate includes the first polarizer, and the second polarizing plate includes the second polarizer. Further, the first and the second polarizing plates include a protective layer as necessary.

Figure 4A:
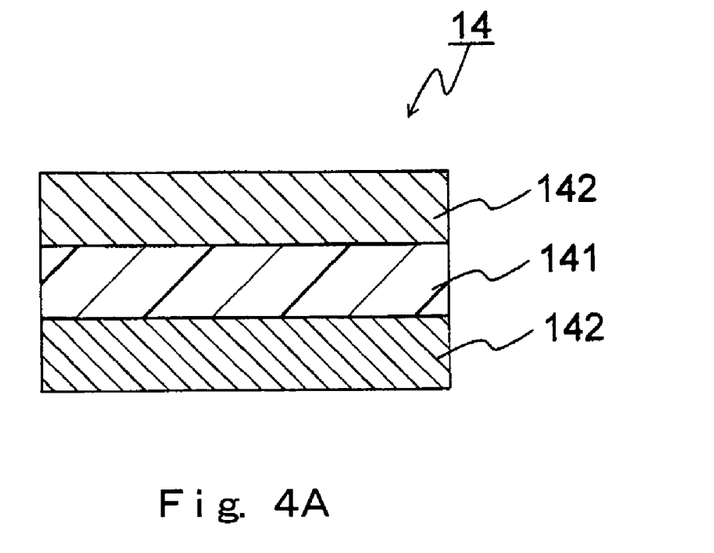
FIGS. 4A, 4B, and 4C are schematic section views showing examples of constitution of a polarizing plate.
Figure 4B:
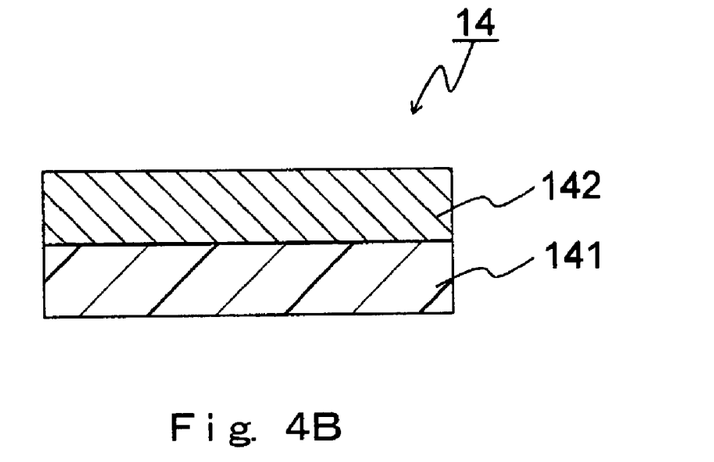
Figure 4C:
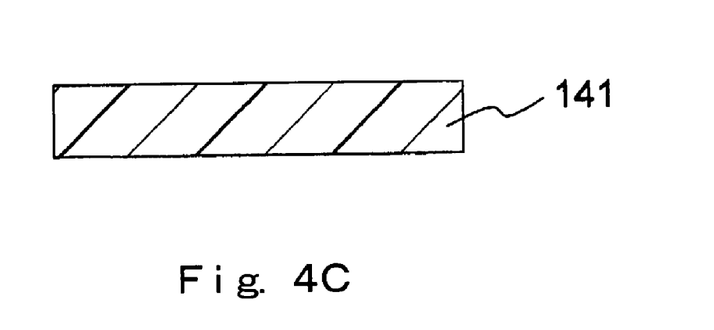

FIGS. 4A, 4B, and 4C show a constitution example of a first and a second polarizing plates, respectively.

In a polarizing plate 14 shown in FIG. 4A, a protective layer 142 is laminated on both sides of a polarizer 141. In a polarizing plate 14 shown in FIG. 4B, a protective layer 142 is laminated on one side of a polarizer 141. A polarizing plate shown in FIG. 4C is made of only a polarizer 141. In the cases of FIGS. 4B and 4C, an optical members such as a first and a second optical compensation layers and the like also function as protective layers. Thicknesses of the first and the second polarizing plates are, for example, from 10 μm to 300 μm.

Transmittance of the first and the second polarizing plates ranges, for example, from 30% to 50%, preferably from 35% to 45%, and more preferably from 38% to 44%. Polarization degree of the first and the second polarizing plate is, for example, 99% or more, preferably 99.5% or more, and more preferably 99.8% or more. The polarization degree can be measured, for example, by using a spectrophotometer (trade name "DOT-3" manufactured by Murakami Color Research Laboratory Co., Ltd.).

[Polarizer]

The first and the second polarizers can be obtained, for example, by stretching a polymer film comprising a polyvinylalcohol-based polymer containing iodine. Content of iodine of the first and the second polarizers is, for example, from 1.8% to 5.0% by mass, and preferably from 2.0% to 4.0% by mass. The first and the second polarizers preferably contain potassium as well as iodine. Content of the potassium is, for example, from 0.2% to 1.0% by mass, and preferably from 0.3% to 0.9% by mass. The first and the second polarizers preferably contain boron as well as iodine. Content of the boron is, for example, from 0.5% to 3.0% by mass, and preferably from 1.0% to 2.8% by mass.

The polyvinyl alcohol-based polymer can be obtained, for example, by saponificating a vinyl ester-based polymer obtainable by polymerization of a vinyl ester-based monomer. Degree of saponification of the polyvinyl alcohol-based polymer is preferably from 95.0% to 99.9% by mol. Average degree of polymerization of the polyvinyl alcohol-based polymer preferably ranges from 1,200 to 3,600. The average degree of polymerization may be determined, for example, according to JIS K6726 (1994).

As for the polymer film comprising the polyvinyl alcohol-based polymer, for example, a commercially available film may be used as it is. The commercially available polymer film includes, for example, "KURARAY vinylon film" (trade name) manufactured by Kuraray Co., Ltd., "TOHCELLO vinylon film" (trade name) manufactured by Tohcello Co., Ltd., "NICHIGO vinylon film" (trade name) manufactured by Nippon Synthetic Chemical Industry Co., Ltd., and the like.

[Protective Layer]

The above protective layer is preferably transparent and colorless. In-plane retardation value (Re (550)) of the protective layer is, for example, from 0 nm to 10 nm, preferably from 0 nm to 6 nm, and particularly preferably from 0 nm to 3 nm. A retardation value (Rth (550)) in the thickness direction of the protective layer is, for example, from 0 nm to 20 nm, preferably from 0 nm to 10 nm, and particularly preferably from 0 nm to 6 nm.

A thickness of the protective layer is, for example, from 20 μm to 200 μm, and preferably from 30 μm to 100 μm.

As the protective layer, for example, a cellulose-based film is used. Generally, as the protective layer, a triacetyl cellulose (TAC) film is used.

As the protective layer, for example, a commercially available polymer film being subjected to surface treatment can be used as it is. As the surface treatment, a diffusion treatment, an antireflection treatment, a hard coating treatment, an antistatic treatment, and the like can be exemplified.

Examples of the commercially available polymer films being subjected to the diffusion treatment (antiglare treatment) include "AG150, AGS1, AGS2" (trade name) and the like manufactured by Nitto Denko Corporation. Examples of the commercially available polymer films being subjected to the antireflection treatment include "ARS, ARC" (trade name) and the like manufactured by Nitto Denko Corporation. Examples of the commercially available polymer films being subjected to the hard coating treatment and the antistatic treatment include "KC8UX-HA" (trade name) and the like manufactured by Konica Minolta Holdings, Inc. Examples of the commercially available polymer films being subjected to the antireflection treatment include "ReoLook series" (trade name) manufactured by NOF Corporation, and the like.

[Adhesive Layer of Optical Member]

Lamination layer of optical members such as the first polarizing plate and the first optical compensation layer are achieved, for example, via an adhesive layer.

As a material that forms the adhesive layer, conventionally known adhesives, pressure-sensitive adhesives, anchor coating agents, and the like may be exemplified. The adhesive layer may be a multilayer structure in which an anchor coating layer is formed on a surface of an adhesive body, and the adhesive layer is formed thereon. Further, the adhesive layer may be a thin layer (also called "hairline") that is unrecognizable by human eyes.

It is preferable that an adhesion surface of the optical member is subjected to easy adhesion treatment. The easy adhesion treatment is preferably conducted, for example, by applying a polymer material on the adhesion surface. As the polymer material, for example, a silicone-based polymer, a urethane-based polymer, an acryl-based polymer, and the like is preferable. An easy adhesion layer is formed on the adhesion surface by conducting the easy adhesion treatment. A thickness of the easy adhesion layer is preferably from 5 nm to 100 nm, and more preferably from 10 nm to 80 nm.

The adhesive layer may be provided on both or either of the optical members to be adhered to each other.

When the pressure-sensitive adhesive is used as the adhesive layer, a solvent-type pressure-sensitive adhesive, a non-aqueous emulsion type pressure-sensitive adhesive, an aqueous pressure-sensitive adhesive, a hot-melt pressure-sensitive adhesive, and the like may be exemplified as the pressure-sensitive adhesive. A thickness of the adhesive layer composed of the pressure-sensitive adhesive is, for example, from 1 μm to 100 μm, and preferably from 3 μm to 50 μm.

When the adhesive is used as the adhesive layer, for example, a water-soluble adhesive, an emulsion-type adhesive, a latex-type adhesive, a mastic adhesive, a multilayer adhesive, a paste-form adhesive, a foam-type adhesive, a supported film adhesive, a thermoplastic adhesive, a heat fusion adhesive, a heat solidification adhesive, a hot-melt adhesive, a heat active adhesive, a heat-seal adhesive, a thermosettable adhesive, a contact-type adhesive, a pressure sensitive type adhesive, a polymerization type adhesive, a solvent-type adhesive, a solvent active adhesive, and the like can be exemplified as the adhesive. A thickness of the adhesive layer composed of the adhesive is, for example, from 0.01 μm to 0.15 μm, and preferably from 0.02 μm to 0.12 μm.

[Liquid Crystal Display]

The liquid crystal display of the present invention has the liquid crystal panel of the present invention. The liquid crystal display of the present invention may be of the same structure as a conventional liquid crystal display except that the liquid crystal panel of the present invention is included. The liquid crystal display of the present invention may be a transmissive type in which a screen is viewed by irradiating a light from the opposite viewing side of the liquid crystal panel. Further, the liquid crystal display of the present invention may be a reflective type in which a screen is viewed by irradiating a light from the viewing side of the liquid crystal panel. The liquid crystal display of the present invention may be a semi-transmissive type having properties of both transmissive type and reflective type.

The liquid crystal display of the present invention is used, for example, office automation equipments such as a personal computer monitor, a notebook computer, and a copying machine; portable equipments such as a portable telephone, a watch, a digital camera, a personal digital assistant (PDA), and a portable game machine; domestic electrical equipments such as a video camera, a television set, and a microwave oven; on-vehicle equipments such as a back monitor, a monitor for a car navigation system, and a car audio; display equipments such as an information monitor for a commercial store; security equipments such as an observation monitor; care/medical equipments such as a care monitor, and a medical monitor; and the like.

Preferably use application of the liquid crystal display of the present invention is a TV set. Screen size of the TV set is, preferably, wide 17-inch type (373 mm×224 mm), more preferably, wide 23-inch type (499 mm×300 mm) or more, and further preferably wide 32-inch type (687 mm×412 mm) or more.

EXAMPLES

Next, Examples of the present invention will be described together with Comparative Examples. The present invention is not limited to the following Examples and Comparative Examples.

Various measurements in the following Examples and Comparative Examples were conducted in the following manner.

(1) Measurement of Re ($\lambda$), Rth($\lambda$), Re$_{40}$($\lambda$), nx, ny and nz:

These were measured by using "Axo Scan" (trade name) manufactured by AXOMETRICS, INC. at 23° C. at each wavelength $\lambda$ nm. For average refractive index, values measured using an Abbe refractometer (trade name "DR-M4" manufactured by Atago Co., Ltd.) were used.

(2) Measurement of Thickness:

Thickness was measured by using a digital micrometer "KC-351C type" manufactured by Anritsu Corporation and "MCPD-2000" manufactured by Otsuka Electronics Co., Ltd.

(3) Measurement of Color Shift:

Color shift was measured by color change when azimuth was varied between 0 to 360° at a polar angle of 60° by using "EZ Contrast 160D" (trade name) manufactured by ELDIM Co. Measurement result was plotted on xy chromaticity diagram in which horizontal axis shows azimuth and vertical axis shows x value and y value (each graph chart).

In the measurement of color shift, when x value and y value do not change, color change is not observed with varied azimuth. That is, in the graph chart, x value and y value are flat. Even when x value and y value do not flat, when viewing angle is changed in the axis direction of a polarizing plate for angles of 45°, 135°, 225°, 315° (when viewing angle is changed from 0° to 90° with reference to 45°, 90° to 180° with reference to 135°, 180° to 270° with reference to 225°, and 270° to 360° with reference to 315°) and the color change is the same (x value and y are symmetrical at 45° interval in the graph chart), it results in that coloring occurs in only a certain direction. In other words, even when coloring occurs, the coloring is in a single color. It is most preferable that x value and y value in the graph chart are flat. Since, even if coloring occurs, coloring in one color will not lead any practical problem for use in a liquid crystal display. On the other hand, when color change differs at variable viewing angle in the axis direction of the polarizing plate for angle of 45°, 135°, 225°, 315° (x value and y value are asymmetrical at 45° in the graph chart), coloring occurs in various colors by varying the viewing angle. Such color change reduces viewing angle of the liquid crystal display, and is most unfavorable color change. In the graph chart, magnitude of amplitude of x value and y value represents degree of coloring, and the larger the shift of x value, y value from the color in the axis direction of the polarizing plate (0°, 90°, 180°, 270°), the larger the coloring becomes. Therefore, in the graph chart, the smaller the amplitude of x value, y value, the better because the coloring is small.

<Use Material>

(1) Optical Compensation Layer (A):

On both surfaces of a norbornene-based film (trade name "ARTON" manufactured by JSR Corporation) having a thickness of 100 μm, a biaxially stretched polypropylene film (trade name "Torayfan E60 high-shrinking type" manufactured by Toray Industries, Inc.) having a thickness of 60 μm was adhered via an acrylic-based pressure-sensitive adhesive having a thickness of 15 μm. The resultant laminate film was then stretched 1.38 times using a roll stretching machine while both end parts in the longitudinal direction thereof were held. Stretching of the laminate film was conducted in an air-circulated dry oven at 146° C.±1° C. From this stretched laminate film, a biaxially stretched polypropylene film was peeled off, and the obtained stretched norbornene-based film was used as an optical compensation layer (A).

The retardation value of the optical compensation layer (A) was measured, it was found that Re(590) was 270 nm, Rth (590) was 135 nm, and Nz coefficient was 0.50. The wavelength dispersion of Re$_{40}$($\lambda$) of the optical compensation layer (A) is as shown in Table 1. The index ellipsoid of the optical compensation layer (A) satisfied a relationship of nx>nz>ny.

TABLE 1

| | Re$_{40}$(450)/ Re$_{40}$(550) | Re$_{40}$(550)/ Re$_{40}$(550) | Re$_{40}$(650)/ Re$_{40}$(550) | Wavelength dispersion |
|---|---|---|---|---|
| Optical compensation layer (A) | 1.00 | 1.00 | 1.00 | Flat dispersion |
| Optical compensation layer (B) | 1.09 | 1.00 | 0.96 | Positive dispersion |
| Optical compensation layer (C) | 1.06 | 1.00 | 0.97 | Positive dispersion |

TABLE 1-continued

|  | $Re_{40}(450)/$ $Re_{40}(550)$ | $Re_{40}(550)/$ $Re_{40}(550)$ | $Re_{40}(650)/$ $Re_{40}(550)$ | Wavelength dispersion |
|---|---|---|---|---|
| Optical compensation layer (D) | 1.00 | 1.00 | 1.00 | Flat dispersion |
| Optical compensation layer (E) | 1.06 | 1.00 | 0.97 | Positive dispersion |
| Optical compensation layer (F) | 0.81 | 1.00 | 1.14 | Reverse dispersion |
| Liquid crystal cell | 1.04 | 1.00 | 0.96 | Positive dispersion |

(2) Optical Compensation Layer (B):

Polyimide (shown by the formula (III) below) synthesized from 2,2'-bis(3,4-dicarboxyphenyl)hexafluoropropane and 2,2'-bis(trifluoromethyl)-4,4'-diaminobiphenyl was dissolved in cyclohexanone, to prepare a coating solution (solid content concentration 15% by mass). This coating solution was applied on 50 μm PET film so that the thickness thereof was 44 μm. The application was followed by drying at 100° C. for 10 minutes, to form a thin film having a thickness of about 6.9 μm. This film having a thickness of about 6.9 μm was used as an optical compensation layer (B).

The optical compensation layer (B) was transferred to a glass plate via a pressure-sensitive adhesive, and peeled from the PET film. The retardation value of the optical compensation layer (B) transferred to the glass plate was measured, it was found that Re (590) was 0.4 nm, and Rth(590) was 272 nm. The wavelength dispersion of $Re_{40}(\lambda)$ of the optical compensation layer (B) was as shown in Table 1. The index ellipsoid of the optical compensation layer (B) satisfied a relationship of nx=ny>nz.

Here, the optical compensation layer (B) was peeled from the glass plate, when the optical compensation layer (B) was adhered to a polarizing plate.

[chemical formula 1]

(3) Optical Compensation Layer (C):

A polyester-based polymer described in Example 4 of [0052] in Japanese Patent Application Laid-Open Publication No. 2004-70332 (polymer (IV) in that publication) was dissolved in a mixed solvent (toluene:cyclohexanone (mass ratio)=8:2), to prepare a coating solution (solid content concentration 10% by mass). This coating solution was applied on 50 μm PET film so that the thickness thereof was 97 μm. The application was followed by drying at 130° C. for 5 minutes, to form a thin film having a thickness of about 9.7 μm. This film having a thickness of about 9.7 μm was used as an optical compensation layer (C).

The optical compensation layer (C) was transferred to a glass plate via a pressure-sensitive adhesive, and peeled from the PET film. The retardation value of the optical compensation layer (C) transferred to the glass plate was measured, it was found that Re (590) was 0.3 nm, and Rth(590) was 269 nm. The wavelength dispersion $Re_{40}(\lambda)$ of the optical compensation layer (C) was as shown in Table 1. The index ellipsoid of the optical compensation layer (C) satisfied a relationship of nx=ny>nz.

Here, the optical compensation layer (C) was peeled from the glass plate, when the optical compensation layer (C) was adhered to a polarizing plate.

(4) Optical Compensation Layer (D):

A norbornene-based film (trade name "ARTON" manufactured by JSR Co., Ltd.) having a thickness of 150 μm was stretched 2.3 times in the longitudinal direction using a roll stretching machine and 2.3 times in the width direction using a tenter stretching machine. Stretching of the film was conducted in an air-circulated dry oven at 140° C.±1° C. The thickness of the stretched film was 43 μm. This stretched norbornene-based film was used as an optical compensation layer (D).

The retardation value of the optical compensation layer (D) was measured, it was found that Re(590) was 0.2 nm, and Rth(590) was 134 nm. The wavelength dispersion of $Re_{40}(\lambda)$ of the optical compensation layer (D) is as shown in Table 1. The index ellipsoid of the optical compensation layer (D) satisfied a relationship of nx=ny>nz.

(5) Optical Compensation Layer (E):

On both surfaces of a polymer film (thickness: 55 μm, polycarbonate-based polymer: styrene-based polymer (mass blending ratio)=75:25) containing a mixture of a polycarbonate-based polymer having a weight-average molecular weight of 60,000 and a styrene-based polymer having a weight-average molecular weight of 1,300, a biaxially stretched polypropylene film (trade name "Torayfan E60 high-shrinking type" manufactured by Toray Industries, Inc.) having a thickness of 60 μm was adhered via an acrylic-based pressure-sensitive adhesive having a thickness of 15 μm. The resultant laminate film was then stretched 1.27 times using a roll stretching machine while both end parts in the longitudinal direction thereof were held. Stretching of the above laminate film was conducted in an air-circulated dry oven at 147° C.±1° C. From this stretched laminate film, a biaxially stretched polypropylene film was peeled off, and the obtained stretched polymer film (film made of a mixed polymer) was used as an optical compensation layer (E).

The retardation value of the optical compensation layer (E) was measured, it was found that Re(590) was 270 nm, Rth (590) was 132 nm, and Nz coefficient was 0.49. The wavelength dispersion of $Re_{40}(\lambda)$ of the optical compensation layer (E) is as shown in Table 1. The index ellipsoid of the optical compensation layer (E) satisfied a relationship of nx>nz>ny.

(6) Optical Compensation Layer (F):

Four triacetylcellulose-based films (trade name "TF80UL", manufactured by Fujifilm Corporation) each having a thickness of 80 μm and one triacetylcellulose-based film (trade name "KC4UY" manufactured by Konica Minolta Holdings, Inc.) having a thickness of 40 μm were adhered together with a pressure-sensitive adhesive having a thickness of 20 μm, to form a laminate film in which a total of five films were laminated. This laminate film was used as an optical compensation layer (F).

The retardation value of the optical compensation layer (F) was measured, it was found that Re(590) was 0.9 nm, and Rth(590) was 272 nm. The wavelength dispersion of $Re_{40}(\lambda)$ of the optical compensation layer (F) is as shown in Table 1. The index ellipsoid of the optical compensation layer (F) satisfied a relationship of nx=ny>nz.

(7) Liquid Crystal Cell:

A liquid crystal panel was taken out from a commercially available liquid crystal television set (product number: LC-46GX2W) manufactured by Sharp Corporation, and all optical films such as polarizing plate arranged above and below the liquid crystal cell were removed. The glass plate of this liquid crystal cell was cleaned on both front and back sides, to thereby prepare a liquid crystal cell.

The wavelength dispersion of $Re_{40}(\lambda)$ of the liquid crystal cell is as shown in Table 1. The index ellipsoid of the liquid crystal cell satisfied a relationship of $nx=ny<nz$.

Example 1

The optical compensation layer (A) was laminated and adhered to a polarizing plate ("SIG" (trade name) manufactured by Nitto Denko Corporation) via an acrylic-based pressure-sensitive adhesive having a thickness of 20 µm, to thereby prepare a polarizing plate (A) having a compensation layer. At this time, these members were laminated so that the direction of slow axis of the optical compensation layer (A) and the direction of absorption axis of the polarizing plate are orthogonal to each other.

The optical compensation layer (B) was laminated and adhered to a polarizing plate ("SIG" (trade name) manufactured by Nitto Denko Corporation) via an acrylic-based pressure-sensitive adhesive having a thickness of 20 λm, to thereby prepare a polarizing plate (B) having a compensation layer. At this time, these members were laminated so that the direction of slow axis of the optical compensation layer (B) and the direction of absorption axis of the polarizing plate are orthogonal to each other.

Next, on the viewing side surface of the liquid crystal cell, the polarizing plate (A) having a compensation layer was adhered via an acrylic-based pressure-sensitive adhesive having a thickness of 20 µm. At this time, adhering was made so that optical compensation layer (A) side of the polarizing plate (A) having a compensation layer faces with the viewing side surface of the liquid crystal cell, and the direction of absorption axis of the polarizing plate (A) having a compensation layer is parallel to the direction of long side of the liquid crystal cell.

Next, on the opposite viewing side surface of the liquid crystal cell, the polarizing plate (B) having a compensation layer was adhered via an acrylic-based pressure-sensitive adhesive having a thickness of 20 µm. At this time, adhering was made so that optical compensation layer (B) side of the polarizing plate (B) having a compensation layer faces with the opposite viewing side surface of the liquid crystal cell, and the direction of absorption axis of the polarizing plate (B) having a compensation layer is orthogonal to the direction of long side of the liquid crystal cell.

In this manner, a liquid crystal panel according to Example 1 was fabricated (see Table 2).

The liquid crystal panel of Example 1 was joined with a backlight unit of the original liquid crystal TV set (above liquid crystal TV set manufactured by Sharp Corporation), to fabricate a liquid crystal TV set.

Figure 5:
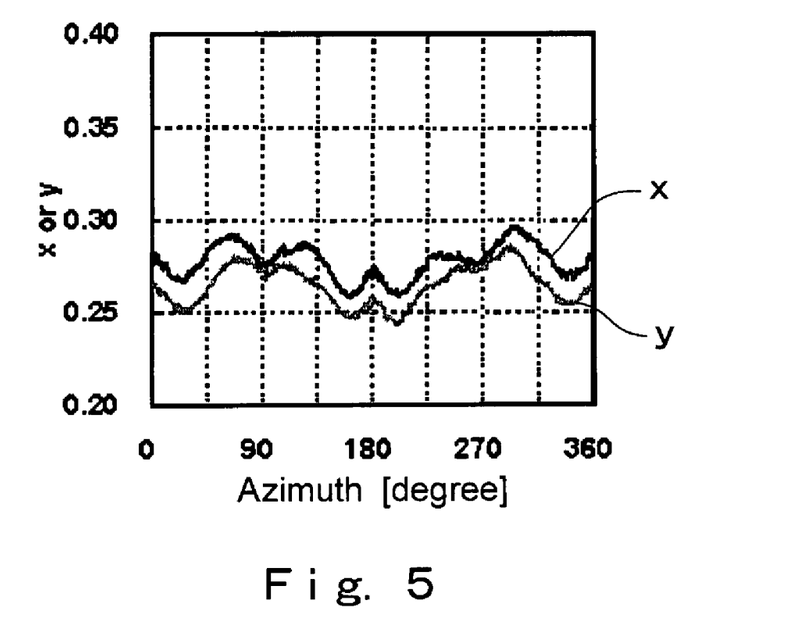
FIG. 5 is a graph showing a result of color shift of a liquid crystal panel of Example 1.

Measurement result of color shift of the obtained liquid crystal TV set is shown in the graph of FIG. 5.

TABLE 2

| | Layer constituent | Used compensation layer | Wavelength dispersion of each layer | Index ellipsoid |
|---|---|---|---|---|
| Example 1 | First optical compensation layer | Optical compensation layer (A) | Flat dispersion | nx > nz > ny |
| | Liquid crystal cell | Liquid crystal cell | Positive dispersion | nx = ny < nz |
| | Second optical compensation layer | Optical compensation layer (B) | Positive dispersion | nx = ny > nz |
| Example 2 | First optical compensation layer | Optical compensation layer (A) | Flat dispersion | nx > nz > ny |
| | Liquid crystal cell | Liquid crystal cell | Positive dispersion | nx = ny < nz |
| | Second optical compensation layer | Optical compensation layer (C) | Positive dispersion | nx = ny > nz |
| Example 3 | First optical compensation layer | Optical compensation layer (A) | Flat dispersion | nx > nz > ny |
| | Liquid crystal cell | Liquid crystal cell | Positive dispersion | nx = ny < nz |
| | Second optical compensation layer | Optical compensation layer (D) | Flat dispersion | nx = ny > nz |
| Example 4 | First optical compensation layer | Optical compensation layer (E) | Positive dispersion | nx > nz > ny |
| | Liquid crystal cell | Liquid crystal cell | Positive dispersion | nx = ny < nz |
| | Second optical compensation layer | Optical compensation layer (B) | Positive dispersion | nx = ny > nz |
| Example 5 | First optical compensation layer | Optical compensation layer (E) | Positive dispersion | nx > nz > ny |
| | Liquid crystal cell | Liquid crystal cell | Positive dispersion | nx = ny < nz |
| | Second optical compensation layer | Optical compensation layer (C) | Positive dispersion | nx = ny > nz |
| Example 6 | First optical compensation layer | Optical compensation layer (E) | Positive dispersion | nx > nz > ny |
| | Liquid crystal cell | Liquid crystal cell | Positive dispersion | nx = ny < nz |
| | Second optical compensation layer | Optical compensation layer (D) | Flat dispersion | nx = ny > nz |

Example 2

One polarizing plate (A) having a compensation layer and one polarizing plate (C) having a compensation layer were fabricated in a similar manner as in Example 1 except that the optical compensation layer (B) used in Example 1 was replaced by the optical compensation layer (C).

Then the polarizing plate (A) having a compensation layer was adhered on the viewing side surface of the liquid crystal cell and the polarizing plate (C) having a compensation layer was adhered on the opposite viewing side surface of the liquid crystal cell in a similar manner as in Example 1.

In this manner, a liquid crystal panel according to Example 2 was fabricated (see Table 2).

The liquid crystal panel of Example 2 was joined to a backlight unit of the original liquid crystal TV set in a similar manner as in Example 1, to fabricate a liquid crystal TV set.

Figure 6:
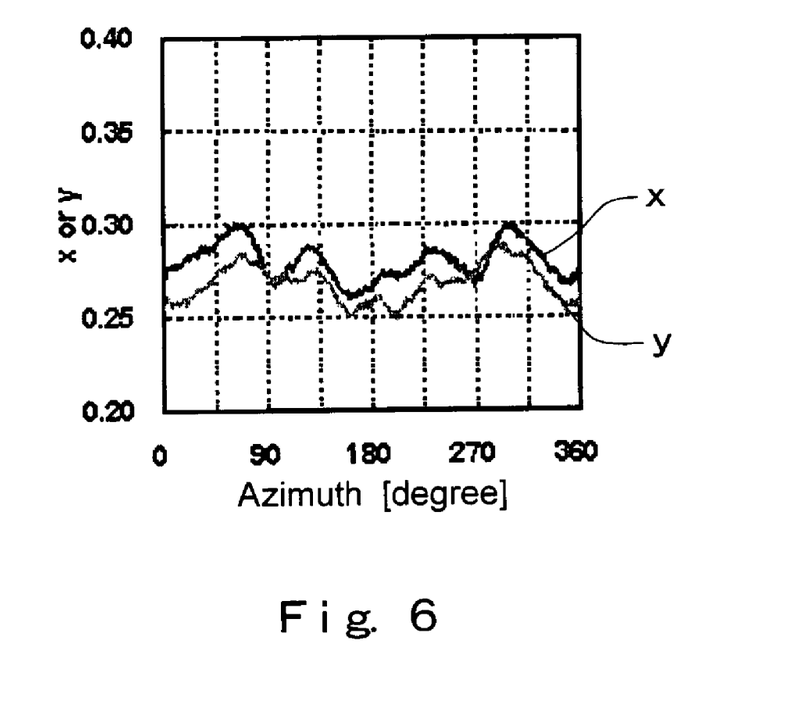
FIG. 6 is a graph showing a result of color shift of a liquid crystal panel of Example 2.

Measurement result of color shift of the obtained liquid crystal TV set is shown in the graph of FIG. 6.

Example 3

The optical compensation layer (A) was laminated and adhered to a polarizing plate ("SIG" (trade name) manufactured by Nitto Denko Corporation) via an acrylic-based pressure-sensitive adhesive having a thickness of 20 μm, to thereby prepare a polarizing plate (A) having a compensation layer. At this time, these members were laminated so that the direction of slow axis of the optical compensation layer (A) and the direction of absorption axis of the polarizing plate are orthogonal to each other.

Two optical compensation layers (D) were prepared to be laminated and adhered to a polarizing plate ("SIG" (trade name) manufactured by Nitto Denko Corporation) via an acrylic-based pressure-sensitive adhesive having a thickness of 20 μm, to thereby prepare a polarizing plate (D) having a compensation layer. At this time, these members were laminated so that the direction of slow axis of the optical compensation layer (D) and the direction of absorption axis of the polarizing plate are orthogonal to each other. Further, the two optical compensation layer (D) were adhered so that the direction of slow axis thereof is parallel to each other.

Next, on the viewing side surface of the liquid crystal cell, the polarizing plate (A) having a compensation layer was adhered via an acrylic-based pressure-sensitive adhesive having a thickness of 20 μm. At this time, adhering was made so that optical compensation layer (A) side of the polarizing plate (A) having a compensation layer faces with the viewing side surface of the liquid crystal cell, and the direction of absorption axis of the polarizing plate (A) having a compensation layer is parallel to the direction of long side of the liquid crystal cell.

Next, on the opposite viewing side surface of the liquid crystal cell, the polarizing plate (D) having a compensation layer was adhered via an acrylic-based pressure-sensitive adhesive having a thickness of 20 μm. At this time, adhering was made so that optical compensation layer (D) side of the polarizing plate (D) having a compensation layer faces with the opposite viewing side surface of the liquid crystal cell, and the direction of absorption axis of the polarizing plate (D) having a compensation layer is orthogonal to the direction of long side of the liquid crystal cell.

In this manner, a liquid crystal panel according to Example 3 was fabricated (see Table 2).

The liquid crystal panel of Example 3 was joined to a backlight unit of the original liquid crystal TV set in a similar manner as in Example 1, to fabricate a liquid crystal TV set.

Figure 7:
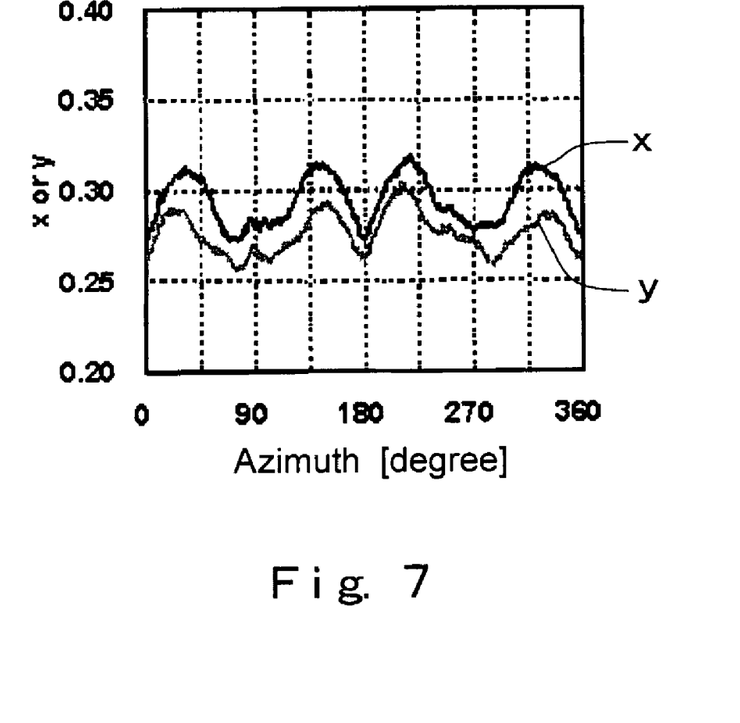
FIG. 7 is a graph showing a result of color shift of a liquid crystal panel of Example 3.

Measurement result of color shift of the obtained liquid crystal TV set is shown in the graph of FIG. 7.

Example 4

One polarizing plate (E) having a compensation layer and one polarizing plate (B) having a compensation layer were fabricated in a similar manner as in Example 1 except that the optical compensation layer (A) used in Example 1 was replaced by the optical compensation layer (E).

Then the polarizing plate (E) having a compensation layer was adhered on the viewing side surface of the liquid crystal cell and the polarizing plate (B) having a compensation layer was adhered on the opposite viewing side surface of the liquid crystal cell in a similar manner as in Example 1.

In this manner, a liquid crystal panel according to Example 4 was fabricated (see Table 2).

The liquid crystal panel of Example 4 was joined to a backlight unit of the original liquid crystal TV set in a similar manner as in Example 1, to fabricate a liquid crystal TV set.

Figure 8:
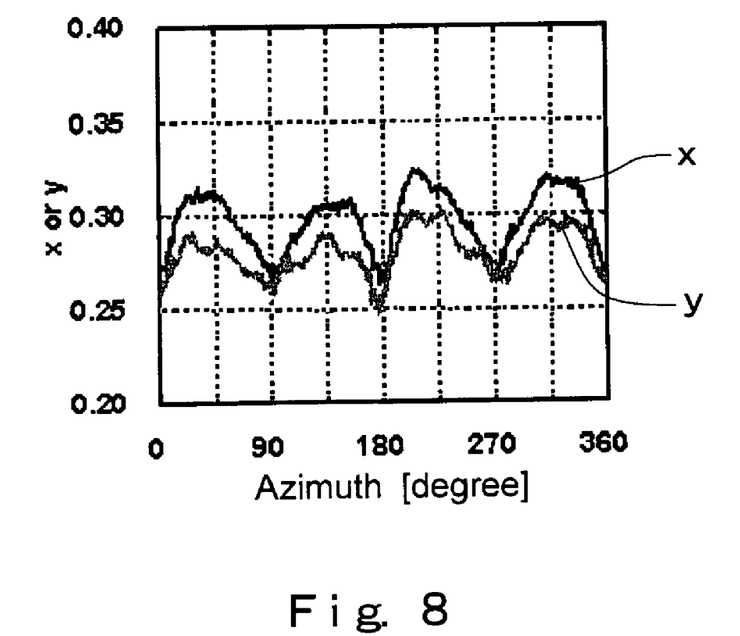
FIG. 8 is a graph showing a result of color shift of a liquid crystal panel of Example 4.

Measurement result of color shift of the obtained liquid crystal TV set is shown in the graph of FIG. 8.

Example 5

One polarizing plate (E) having a compensation layer and one polarizing plate (C) having a compensation layer were fabricated in a similar manner as in Example 1 except that the optical compensation layer (A) used in Example 1 was replaced by the optical compensation layer (E) and the optical compensation layer (B) used in Example 1 was replaced by the optical compensation layer (C).

Then the polarizing plate (E) having a compensation layer was adhered on the viewing side surface of the liquid crystal cell and the polarizing plate (C) having a compensation layer was adhered on the opposite viewing side surface of the liquid crystal cell in a similar manner as in Example 1.

In this manner, a liquid crystal panel according to Example 5 was fabricated (see Table 2).

The liquid crystal panel of Example 5 was joined to a backlight unit of the original liquid crystal TV set in a similar manner as in Example 1, to fabricate a liquid crystal TV set.

Figure 9:
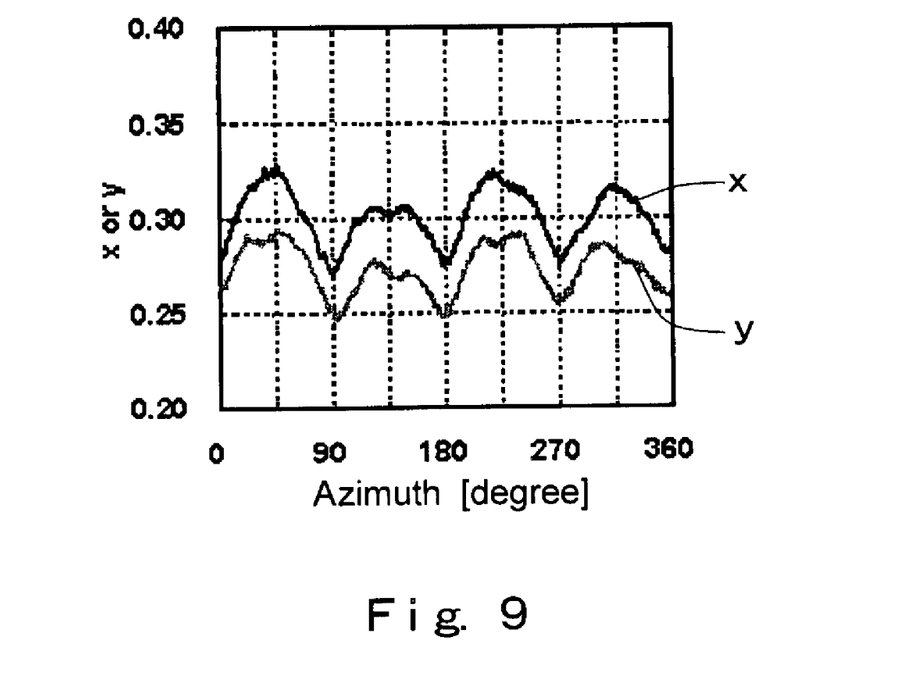
FIG. 9 is a graph showing a result of color shift of a liquid crystal panel of Example 5.

Measurement result of color shift of the obtained liquid crystal TV set is shown in the graph of FIG. 9.

Example 6

One polarizing plate (E) having a compensation layer and one polarizing plate (D) having a compensation layer were fabricated in a similar manner as in Example 1 except that the optical compensation layer (A) used in Example 1 was replaced by the optical compensation layer (E).

Then the polarizing plate (E) having a compensation layer was adhered on the viewing side surface of the liquid crystal cell and the polarizing plate (D) having a compensation layer was adhered on the opposite viewing side surface of the liquid crystal cell in a similar manner as in Example 1.

In this manner, a liquid crystal panel according to Example 6 was fabricated (see Table 2).

The liquid crystal panel of Example 6 was joined to a backlight unit of the original liquid crystal TV set in a similar manner as in Example 1, to fabricate a liquid crystal TV set.

Figure 10:
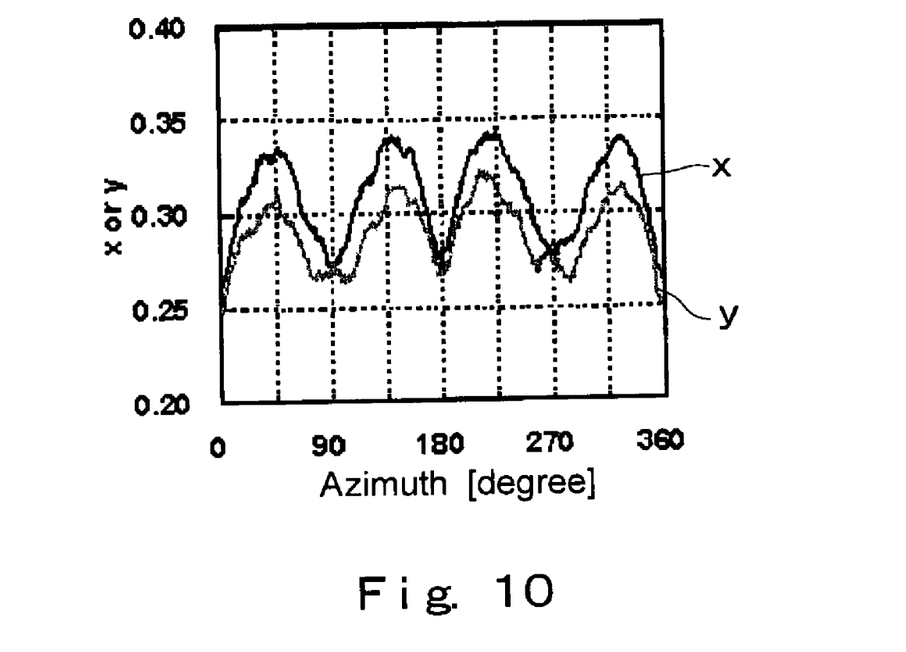
FIG. 10 is a graph showing a result of color shift of a liquid crystal panel of Example 6.

Measurement result of color shift of the obtained liquid crystal TV set is shown in the graph of FIG. 10.

Comparative Example 1

One polarizing plate (A) having a compensation layer and one polarizing plate (F) having a compensation layer were fabricated in a similar manner as in Example 1 except that the optical compensation layer (B) used in Example 1 was replaced by the optical compensation layer (F).

Then the polarizing plate (A) having a compensation layer was adhered on the viewing side surface of the liquid crystal cell and the polarizing plate (F) having a compensation layer was adhered on the opposite viewing side surface of the liquid crystal cell in a similar manner as in Example 1.

In this manner, a liquid crystal panel according to Comparative Example 1 was fabricated (see Table 3).

The liquid crystal panel of Comparative Example 1 was joined to a backlight unit of the original liquid crystal TV set in a similar manner as in Example 1, to fabricate a liquid crystal TV set.

Figure 11:
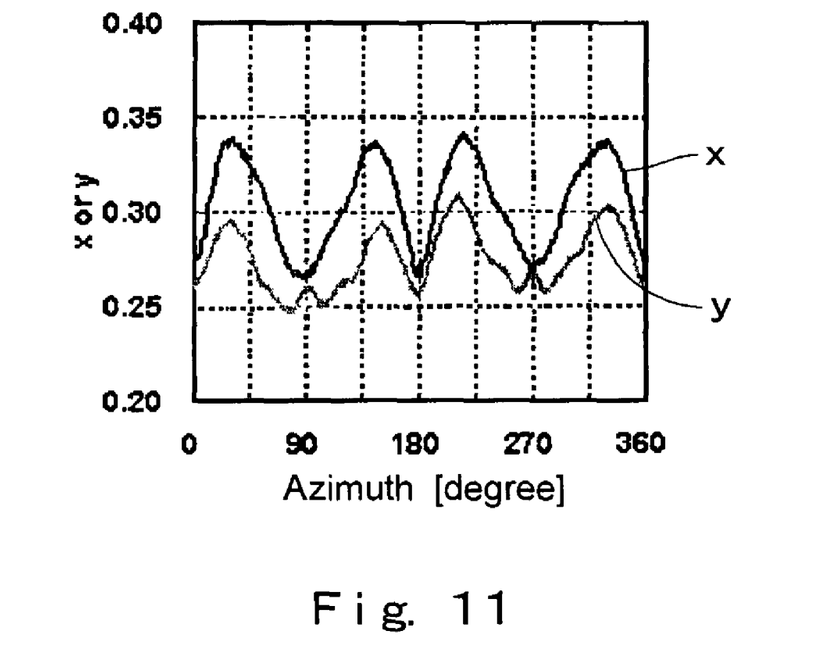
FIG. 11 is a graph showing a result of color shift of a liquid crystal panel of Comparative Example 1.

Measurement result of color shift of the obtained liquid crystal TV set is shown in the graph of FIG. 11.

TABLE 3

| | Layer constitution | Used compensation layer | Wavelength dispersion of each layer | Index ellipsoid |
|---|---|---|---|---|
| Comparative Example 1 | First optical compensation layer | Optical compensation layer (A) | Flat dispersion | nx > nz > ny |
| | Liquid crystal cell | Liquid crystal cell | Positive dispersion | nx = ny < nz |
| | Second optical compensation layer | Optical compensation layer (F) | Reverse dispersion | nx = ny > nz |
| Comparative Example 2 | First optical compensation layer | Optical compensation layer (E) | Positive dispersion | nx > nz > ny |
| | Liquid crystal cell | Liquid crystal cell | Positive dispersion | nx = ny < nz |
| | Second optical compensation layer | Optical compensation layer (F) | Reverse dispersion | nx = ny > nz |

Comparative Example 2

One polarizing plate (E) having a compensation layer and one polarizing plate (F) having a compensation layer were fabricated in a similar manner as in Example 1 except that the optical compensation layer (A) used in Example 1 was replaced by the optical compensation layer (E) and the optical compensation layer (B) used in Example 1 was replaced by the optical compensation layer (F).

Then the polarizing plate (E) having a compensation layer was adhered on the viewing side surface of the liquid crystal cell and the polarizing plate (F) having a compensation layer was adhered on the opposite viewing side surface of the liquid crystal cell in a similar manner as in Example 1.

In this manner, a liquid crystal panel according to Comparative Example 2 was fabricated (see Table 3).

The liquid crystal panel of Comparative Example 2 was joined to a backlight unit of the original liquid crystal TV set in a similar manner as in Example 1, to fabricate a liquid crystal TV set.

Figure 12:
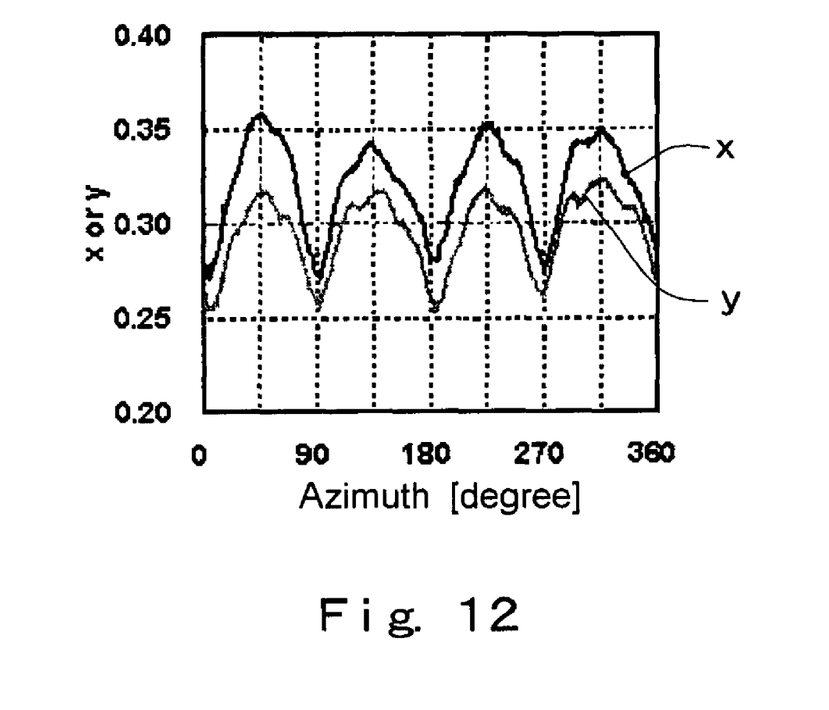
FIG. 12 is a graph showing a result of color shift of a liquid crystal panel of Comparative Example 2.

Measurement result of color shift of the obtained liquid crystal TV set is shown in the graph of FIG. 12.

It can be found that the liquid crystal panels according to Examples 1 to 6 are smaller in color shift amount than the liquid crystal panels according to Comparative Examples 1 and 2. In particular, the liquid crystal panels according to Examples 1 to 3 have relatively small amplitudes of x value and y value and therefore are excellent. Therefore, the liquid crystal panels of Examples 1 to 6 can realize neutral display with substantially no coloring in all directions.

What is claimed is:

1. A liquid crystal panel comprising: a liquid crystal cell; a first polarizer and a second polarizer provided on both sides of the liquid crystal cell; a first optical compensation layer provided between the liquid crystal cell and the first polarizer; and a second optical compensation layer provided between the liquid crystal cell and the second polarizer, wherein a wavelength dispersion of the liquid crystal cell satisfies $Re_{40}(450) > Re_{40}(550) > Re_{40}(650)$, an index ellipsoid of the first optical compensation layer satisfies a relationship of $nx > nz > ny$, and a wavelength dispersion of the second optical compensation layer satisfies $Re_{40}(450) \geqq Re_{40}(550) \geqq Re_{40}(650)$, wherein $Re_{40}(\lambda)$ represents a retardation value measured from the direction of a polar angle of 40° at 23° C. with light of a wavelength $\lambda$ nm, nx represents a refractive index in the direction in which the refractive index is maximum in a plane of the optical compensation layers or the liquid crystal cell (X axis direction), ny represents a refractive index in the direction orthogonal to the X axis direction in the plane (Y axis direction), and nz represents a refractive index in the direction orthogonal to the X axis direction and the Y axis direction.

2. The liquid crystal panel according to claim 1, wherein a wavelength dispersion of the first optical compensation layer satisfies $0.7 < Re_{40}(450)/Re_{40}(550) < 1.2$.

3. The liquid crystal panel according to claim 1, wherein an index ellipsoid of the second optical compensation layer satisfies a relationship of $nx \geqq ny > nz$.

4. The liquid crystal panel according to claim 1, wherein an Nz coefficient of the second optical compensation layer is larger than an Nz coefficient of the first optical compensation layer.

5. The liquid crystal panel according to claim 1, wherein a ratio of retardation values ($Re_{40}(450)/Re_{40}(550)$) of the first optical compensation layer is smaller than a ratio of retardation values ($Re_{40}(450)/Re_{40}(550)$) of the liquid crystal cell.

6. The liquid crystal panel according to claim 1, wherein the first optical compensation layer contains at least one kind of polymer selected from norbornene-based polymers, mixed polymers of a polycarbonate-based polymer and a styrene-based polymer, cellulose-based polymers, polyvinyl alcohol-based polymers, and polyester-based polymers as a main component.

7. The liquid crystal panel according to claim 1, wherein the second optical compensation layer contains at least one kind of polymer selected from norbornene-based polymers, polyimide-based polymers, and polyester-based polymers as a main component.

8. The liquid crystal panel according to claim 1, wherein the liquid crystal cell is in a vertically aligned (VA) mode.

9. A liquid crystal display having the liquid crystal panel according to claim 1.

* * * * *